No. 805,755. PATENTED NOV. 28, 1905.
L. J. ROBICHAUX.
AXLE NUT DEVICE.
APPLICATION FILED FEB. 25, 1905.
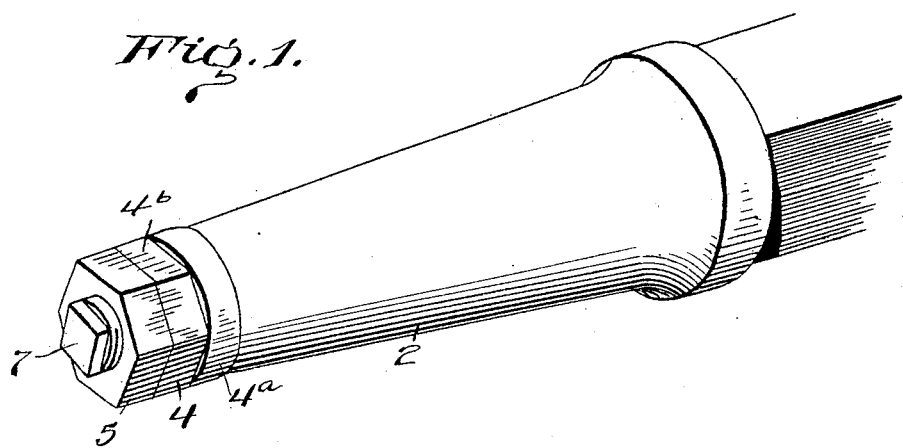
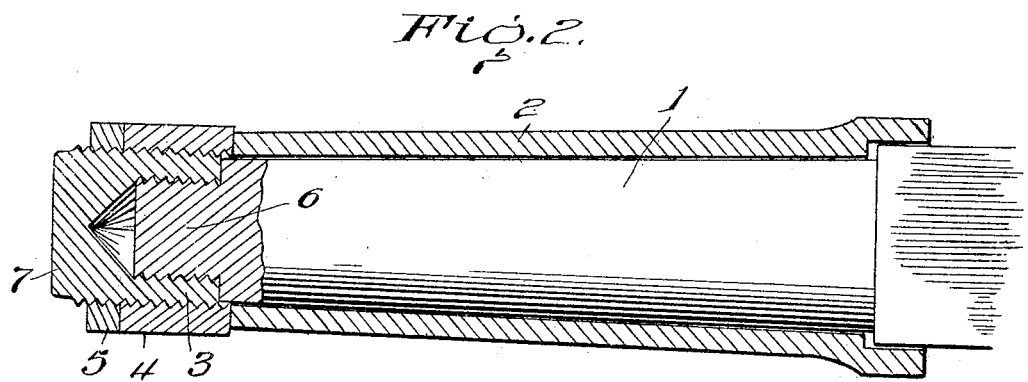
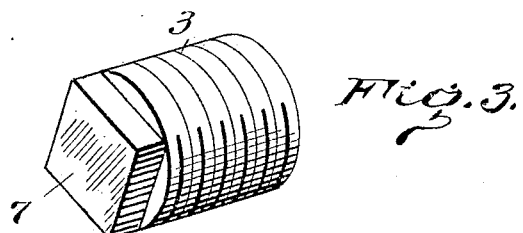
Inventor
L. J. Robichaux

UNITED STATES PATENT OFFICE.

LEONARD J. ROBICHAUX, OF CHARENTON, LOUISIANA.

AXLE-NUT DEVICE.

No. 805,755.  Specification of Letters Patent.  Patented Nov. 28, 1905.

Application filed February 25, 1905. Serial No. 247,357.

*To all whom it may concern:*

Be it known that I, LEONARD J. ROBICHAUX, a citizen of the United States, residing at Charenton, in the parish of St. Mary and State of Louisiana, have invented certain new and useful Improvements in Axle-Nut Devices, of which the following is a specification.

This invention involves the provision of a novel form of axle-nut particularly designed to be used in connection with axle-spindles in combination with special coactuating parts adapted to take up the wear between the nut device and the axle-box of the wheel mounted upon a spindle.

The device combines simplicity and cheapness and obviates all likelihood of looseness or play of a wheel when held in place thereby, resultant advantages being secured which will be of obvious import to those versed in the art to which the invention applies.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment of the invention is shown in the accompanying drawings, in which—

Figure 1 is a perspective view of the end portion of an axle, the axle-box being shown in position thereon and the invention shown properly applied. Fig. 2 is a longitudinal vertical sectional view of the parts shown in Fig. 1. Fig. 3 is a detail perspective view of the axle-nut proper.

Corresponding and like parts are referred to in the following description and indicated in all the views of the drawings by the same reference characters.

The axle arm or spindle 1 and the axle-box 2, as illustrated in the drawings, are of a common structure such as is at present in use. The device comprising the invention consists, essentially, of three separate parts which will be called the "axle-nut" 3, the "wear-nut" 4, and the "jam-nut" 5. The axle-nut 3 is internally as well as externally threaded, being closed at its outer end in order to prevent entrance of foreign matter between the nut and spindle 1. The nut 3 is adapted to be screwed upon a reduced threaded extension 6 of the arm or spindle 1, and the outer closed portion of the nut aforesaid is squared, as indicated at 7, in order to admit of ready removal or application of the nut by means of an ordinary wrench or similar tool. The nut 4 is internally threaded and is adapted to be screwed upon external threads of the nut 3, said nut 4 being of approximately circular form at its inner portion, as shown at $4^a$, and having its outer portion of many-sided form, being hexagonal in shape, as illustrated at $4^b$. The part $4^b$ admits of use of a wrench or similar tool in securing the said nut in position. The inner portion $4^a$ is adapted to engage the outer extremity of the axle-box 2 in order to prevent displacement of the latter from the arm 1. To firmly lock or hold the nut 4 in place, the third nut 5, before mentioned, is used, the latter being a ring-nut of common type which is designed to be screwed upon the externally-threaded portion of the member 3, and when forced hard against the member 4 the latter will be firmly held from displacement.

It will be apparent that the member 4 constitutes the wear element for contact with the axle-box 2, and the said element is adjustably mounted with relation to the member 2 so that looseness or play of the latter may be taken up under the actual conditions of service. The jam-nut 5 performs the function of a suitable lock device, holding the wear element in proper position as adjusted, obviating likelihood of accidental displacement of this part. A brass or hard-metal washer may be interposed between the element 4 and the axle-box. The outer squared end portion 7 of the axle-nut 3 is smaller than the threaded openings in the wear and jam nuts 4 and 5, respectively, the above admitting of displacement of the nuts 4 and 5 before displacement of the nut 3, should the latter be necessary or desired under conditions of actual use. The nuts 4 and 5 may also, of course, be applied or placed in position for coöperation with the axle-box of the wheel after the axle-nut 3 has been secured upon the spindle 1, owing to the reduced formation of the head 7, as before mentioned.

Having thus described the invention, what is claimed as new is—

In a device of the class described, the combination of the spindle 1 having the reduced threaded end portion 6, the axle-box 2 carried by the spindle 1, the externally and internally threaded axle-nut 3 secured upon the threaded portion 6 of the spindle 1 and having its outer end portion squared as shown at 7, the internally-threaded portion of the axle-nut receiving the reduced threaded end of the spindle, the wear-nut 4 secured upon the externally-threaded portion of the axle-nut 3, and the jam-nut 5 also secured upon the externally-threaded portion of the axle-nut 3 for coöperation with the wear-nut to prevent unscrewing of the latter, the outer squared end portion 7 of the axle-nut being smaller than the threaded openings in the wear and jam nuts for the purpose specified.

In testimony whereof I affix my signature in presence of two witnesses.

LEONARD J. ROBICHAUX. [L. S.]

Witnesses:
GEO. T. VEEDER,
E. N. COCKES.